United States Patent [19]

Kelley et al.

[11] Patent Number: 5,009,875
[45] Date of Patent: Apr. 23, 1991

[54] PROCESS OF PREPARING CLORINE DIOXIDE AND APPARATUS THEREFOR

[75] Inventors: Joseph M. Kelley, Westfield, N.J.; Donald C. Kucher, Quakertown, Pa.; George Mayurnik, Franklin Lakes, N.J.

[73] Assignee: International Dioxcide, Inc., Clark, N.J.

[21] Appl. No.: 227,634

[22] Filed: Aug. 3, 1988

[51] Int. Cl.$^5$ .................. C01B 11/02; G05D 7/00
[52] U.S. Cl. ................................. 423/477; 422/111
[58] Field of Search ............. 436/125, 163, 168, 164, 436/; 423/477, 478, 479, 480; 422/111

[56] References Cited

U.S. PATENT DOCUMENTS

| | | | |
|---|---|---|---|
| 3,286,992 | 11/1966 | Armemades et al. | 423/DIG. 9 |
| 4,247,531 | 1/1981 | Hicks | 423/477 |
| 4,250,159 | 2/1981 | Cowley | 423/480 |

FOREIGN PATENT DOCUMENTS 2343171  8/1973  Fed. Rep. of Germany ...... 423/477

OTHER PUBLICATIONS

Perry's Chemical Engineer's Handbook, 6th Ed., Green et al., McGraw-Hill Book Co., 1984, pp. 6-105 to 6-107.

Primary Examiner—Gary P. Straub
Assistant Examiner—Stephen G. Kalinchak
Attorney, Agent, or Firm—Burns, Doane, Swecker & Mathis

[57] ABSTRACT

Provided is a process for the preparation of chlorine dioxide. The process comprises separately feeding compounds, which when reacted together yield chlorine dioxide, into a diluting water stream. The compounds react to thereby form chlorine dioxide. Shutoff valves are provided in the feed lines of the compounds, which shutoff valves are in cooperation with a supply monitoring system and a pH meter. The supply monitoring system monitors the feed lines of the compounds and the water stream. When the monitoring detects a loss in the supply of the water or one of the compounds, shutoff valves are closed to restrict any further flow of the compounds through the feed lines. The pH meter is located downstream of the reaction and monitors the pH of the chlorine dioxide solution formed by the reaction. When the pH is detected to be outside of a particular range, the shutoff valve are closed to restrict any further flow of the compounds through the feed lines. This system for generating chlorine dioxide has the advantage of allowing one to prepare chlorine dioxide of optimal quality on a consistent basis. Moreover, the system provides for immediate safeguards in the event of an emergency. Such safeguards are extremely important when dealing with hazardous chemicals, such as those used in the generation of chlorine dioxide.

11 Claims, 1 Drawing Sheet

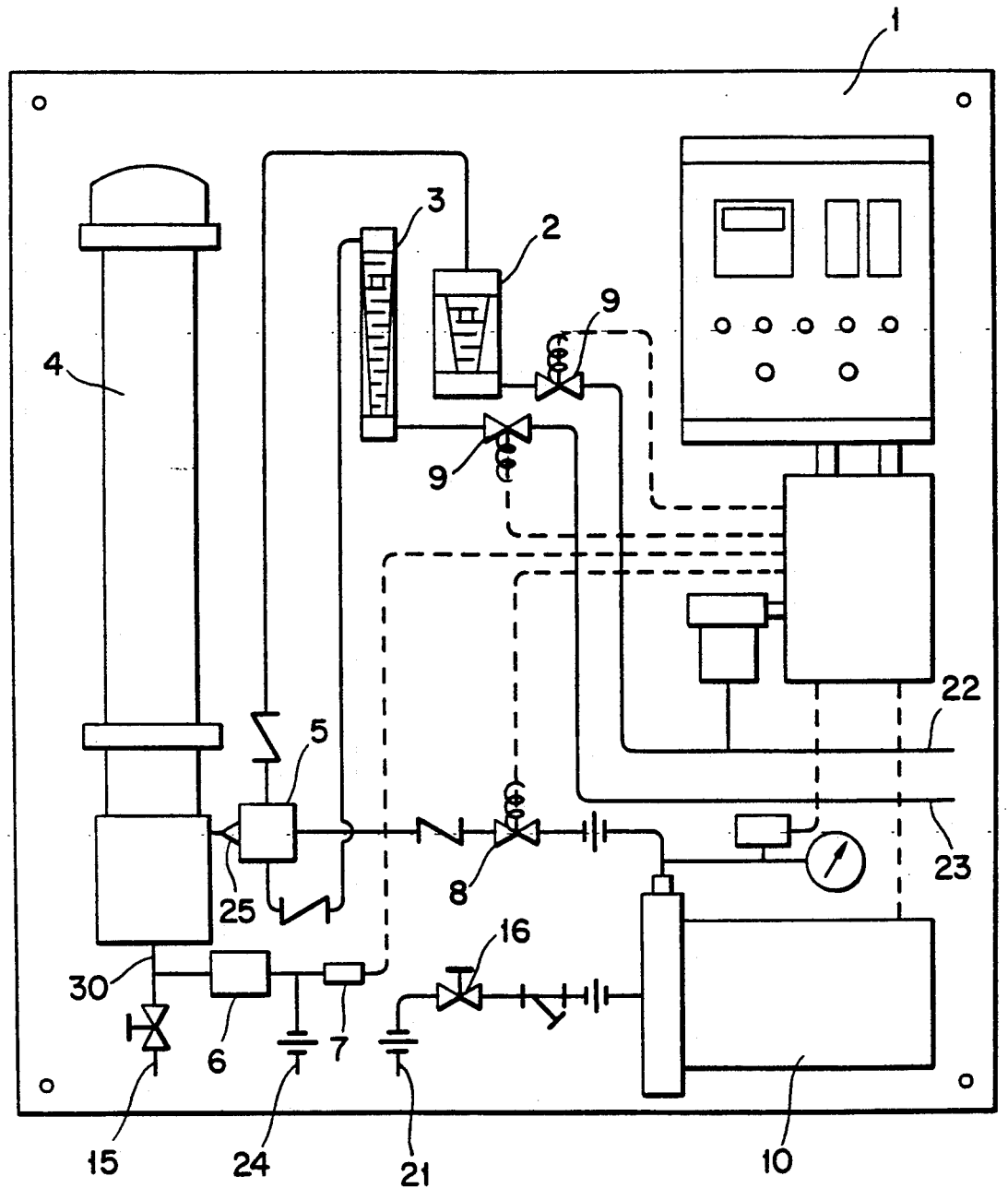

PROCESS OF PREPARING CLORINE DIOXIDE AND APPARATUS THEREFOR

BACKGROUND OF THE INVENTION

1. Field of the Invention

The present invention relates to the production of chlorine dioxide. More particularly, the present invention relates to a process and system for generating chlorine dioxide which contains safeguards against hazardous conditions and conducting the reaction under less than optimal conditions.

2. Description of the Prior Art

Chlorine dioxide is utilized in a variety of processes including a large number of bactericidal applications, especially in the fields of water treatment and odor abatement. Its usage is continuing to grow for many reasons. Due to the unstable nature of gaseous chlorine dioxide when compressed, however, it is necessary to produce chlorine dioxide on site rather than to produce it at a plant and ship it for usage when needed. State of the art process generally involve the production of chlorine dioxide by the reaction of a chlorinated water stream with an alkaline chlorite, followed by the introduction of the generated chlorine dioxide from such reaction into the particular material or system to be treated.

The prior art is filled with disclosures of various types of chlorine dioxide generators, most of which comprise elongated glass or plastic columns of various constructions. Reference is made, for instance, to U.S. Pat. Nos. 4,013,761, 3,502,443, 3,816,077 and German Patent No. 2,343,171.

In U.S. Pat. No. 4,247,531, there is disclosed a system for the preparation of chlorine dioxide which includes a T-shaped premix chamber in fluid communication with the low pressure zone beyond the throat of the venturi of the eductor. The premix chamber allows for the chemical reactants to premix in the absence of dilution water. The generated chlorine dioxide gas is then immediately educted and diluted with water. The alleged advantages of such a system is to provide a more efficient generation process.

The chemicals employed in chlorine dioxide generation are extremely hazardous, however, and many systems have inadequate safeguards to deal with a potentially hazardous situation. Such situations can arise if too much of one chemical reactant or the other is used in the reaction, or it the concentration of the chlorine dioxide becomes too great, i.e., is insufficiently diluted. A concentration of $ClO_2$ above 10% in air is described in Kirk-Othmer Encyclopedia of Chemical Technology as potentially explosive, and it is well known that several generating systems which have exceeded this limit have had serious explosions. Moreover, besides creating a hazardous situation, the efficiency of the entire process is generally affected.

The prior art processes have not adequately addressed these concerns. Hence, a process which permits one to avoid potentially hazardous situations and to generate chlorine dioxide under optimal conditions would certainly be of benefit to the industry. Such a process has heretofore been unknown to the prior art.

Accordingly, it is an object of the present invention to provide a novel process and system for the generation of chlorine dioxide.

Yet another object of the present invention is to provide a novel process and system for the generation of chlorine dioxide which are highly efficient and safe.

Still another object of the present invention is to provide a process and system for the generation of chlorine dioxide which permit the preparation of chlorine dioxide under optimal conditions while avoiding potentially hazardous situations.

These and other objects, as well as the scope, nature and utilization of the invention, will become apparent to those skilled in the art from the following description, the drawing, and the appended claims.

SUMMARY OF THE INVENTION

In accordance with the foregoing objects, there is provided a process for the preparation of chlorine dioxide which comprises (a) separately feeding compounds, which when reacted together yield chlorine dioxide, via separate feed lines into a water stream, followed by complete mixing of the compounds;

(b) allowing said compounds to react in said water stream to yield chlorine dioxide and thereby form a chlorine dioxide solution;

(c) providing shutoff valves in the feed lines of the compounds and monitoring the feed lines of the compounds and the water stream with a monitoring system which is in cooperation with the shutoff valves such that when the monitoring system detects a predetermined loss in the supply of said compounds or water stream, the shutoff valves in the feed lines are closed to restrict any further flow of the compounds in the feed lines; and (d) providing a pH meter downstream of the reaction between the compounds to yield chlorine dioxide and monitoring the pH of the formed chlorine dioxide solution, with the pH meter being in cooperation with the shutoff valves in the feed lines of the compounds such that the shutoff valves are closed to restrict any further flow of the compounds through the feed lines when the pH meter detects a predetermined pH.

In another embodiment, there is provided a system for the generation of chlorine dioxide which comprises (a) supply means for a water stream and means for delivering the water stream to a reaction zone;

(b) supply means for reactant compounds, which when reacted together yield chlorine dioxide, and feed lines for separately feeding the reactant compounds to the water stream prior to reaction in the reaction zone;

(c) mixing means for insuring complete mixing of the compounds after feeding the reactant compounds to the water stream;

(d) means for transferring the reaction product from the reaction zone;

(e) shutoff valves in the feed lines of the reactant compounds;

(f) a monitoring system for monitoring the supply of water and reactant compounds through the feed lines with the monitoring system being in cooperation with the shutoff valves such that shutoff valves are closed to restrict any further flow in the feed lines of the reactant compounds when the monitoring system detects a predetermined loss in the supply of the reactant compounds or water; and (g) a pH meter downstream of the reaction zone, with the pH meter monitoring the pH of the chlorine dioxide reaction product solution being transferred from the reaction zone, and the pH meter being in cooperation with the shutoff valves in the feed lines such that the shutoff valves are closed to restrict any further flow through the feed lines when a predetermined pH is detected.

The process and system of the present invention allow one to generate chlorine dioxide under optimal conditions, safely and efficiently. The safeguards employed are not overburdening, yet are effective for insuring optimal, efficient generation of chlorine dioxide.

BRIEF DESCRIPTION OF THE DRAWING

The Figure of the drawing schematically depicts a system useful in the practice of the present invention.

DETAILED DESCRIPTION OF THE PREFERRED EMBODIMENTS

In the process of the present invention, reactant compounds, which when reacted together yield chlorine dioxide, are separately fed via feed lines into a water stream, and preferably into an eductor through which the water stream is flowing. It is important that the compounds are separately fed into the water stream in order to avoid any premixing of the reactant compounds prior to dilution in the water stream. Thus, the reactant compounds are fed by separate feed lines.

Suitable compounds for the reaction generating chlorine dioxide are well known in the art. Two or three reactant combinations can be used in the process of the present invention. However, it is most preferred that the subject process utilize an alkaline chlorite and gaseous chlorine as the reactants. Sodium chlorite is the preferred alkaline chlorite reactant, with a 25% solution of sodium chlorite being most practical for purposes of practicing the inventive process.

Once the reactant compounds are introduced into the water stream, the compounds are completely mixed, preferably by passage through a static mixer. Upon commingling the reactant compounds with the water stream, they react to thereby generate chlorine dioxide in high yields. The generation of chlorine dioxide in the water stream forms a chlorine dioxide solution. The generation of the chlorine dioxide in the water immediately dilutes the hazardous gas, avoiding any potential problems. The reaction preferably occurs in a reaction chamber or line providing sufficient retention time to provide high yields of chlorine dioxide.

Shutoff valves are provided in the feed lines of the reactant compounds. When closed, the shutoff valves restrict any further flow of the compounds through the feed lines. In the system of the present invention, these shutoff valves can be actuated by a supply monitoring system which monitors the feed lines of the reactant compounds, as well as the water stream, or a pH meter situated downstream of the reaction zone. The use of these shutoff valves in this manner is an important safeguard in efficiently and safely preparing quality chlorine dioxide under optimal conditions.

The feed lines of the reactant compounds and the water stream are thus monitored by the supply monitoring system for the supply of reactants and water flowing through the lines. When the monitoring system detects a particular loss in the supply of any of the reactant compounds or the water stream, which amount of loss can be predetermined, the shutoff valves in the feed lines of the compounds are closed in order to restrict any further flow of the compounds through the feed lines. The shutoff valves, for example, can be electric solenoid valves so that the monitoring system can control the opening and closing of the valves by electrical means.

The pH meter is also in cooperation with the shutoff valves in the feed lines such that actuation of the shutoff valves to restrict further reactant compound flow can be initiated by the pH meter. Again, the preferred method involves the valves being electric solenoid valves so that they might be operated simply by electrical current.

The monitoring of the pH meter as used in the present process is extremely important to the objectives of the invention. The use of this pH meter permits the generation of a quality chlorine dioxide product under optimal conditions. Incomplete reaction of the sodium chlorite or free chlorine, and the existence of any unreacted sodium chlorite or free chlorine in the product solution, is extremely undesirable. Optimum pH for the subsequent chlorine dioxide product solution is from about 2.7 to about 3.5. Thus, it is preferred that the pH meter monitor the product solution to ensure that it is within this pH range. Should the pH vary outside this range, the flow of reactant chemicals may be automatically shutdown by closing the shutoff valves. This will prevent any further generation of chlorine dioxide until the appropriate adjustments can be made. A startup time delay can also be incorporated to facilitate any necessary initial adjustments.

An optional safeguard which might be employed in the process of the present invention is the use of a colorimeter downstream from the reaction. This colorimeter would be able to monitor the chlorine dioxide concentration in the product solution based on color. If the chlorine dioxide solution exceeds a particular concentration, e.g., 4000 mg/l, a potentially dangerous situation exists. Should the concentration rise above such a level, the color of the solution should change sufficiently to be detected by the colorimeter. The colorimeter, as the pH meter and the supply monitoring system, can be in cooperation or interlocked with the shutoff valves such that the shutoff valves will be closed once the colorimeter detects a rise in the concentration of chlorine dioxide above such a predetermined level.

Another advantage of the present system is the existence of a purge cycle. Whenever the shutoff valves are closed in order to shutdown the flow of reactant compounds, the water stream continues to flow throughout the system. This flow of water, preferably through an eductor, purges the entire system of all chemical reactants and all chlorine dioxide solution. If desired, this purge cycle can also be employed for routine shutdown and maintenance of the system. In such a case, the purge cycle can incorporate a timer and relays. The water flow is then continued until all chemicals are purged from the respective feed lines and all the chlorine dioxide solution is purged from the system. When the timing cycle is complete, the generator remains shutdown until it is restarted manually or the alarm contacts are reset.

The reactant compound feed lines are generally under vacuum. Thus, whenever the lines are shutdown by use of the shutdown valves, they are also preferably evacuated to a vacuum level of about 20 inches of Mercury. This eliminates the possibility of chemicals escaping from the feed lines during shutdown and/or maintenance procedures.

Once the reaction to form chlorine dioxide is achieved, the product chlorine dioxide in water is then generally transferred to a storage tank, or directly to an ultimate end use, e.g., a municipal water treatment plant or the treatment of waste in a sewage plant. When the product is transferred to a storage tank, it is preferred that the storage tank is a hydropneumatic storage tank. In particular, it is preferred that the process of the present invention is operated on an on/off basis from a level control within such a storage tank. Thus, when a sufficient level is reached in the storage tank, the generation of chlorine dioxide is halted, and when the storage tank can accommodate additional chlorine dioxide, the process for generation of chlorine dioxide is initiated or continued. Such a system insures maximum yield and consistent delivery of a quality chlorine dioxide solution having a predictable concentration level to the ultimate end use.

The storage tank is preferably a closed tank, thereby precluding any escape of chlorine dioxide vapors to the atmosphere. It is also preferred that the tank be equipped with an eductor and booster pump to provide a vacuum with which to draw the chlorine dioxide solution from the storage tank. Such an eductor system is believed more reliable than a diaphragm metering pump and prevents the use of a high pressure chlorine dioxide solution line.

Turning now to the Figure of the Drawing, there is schematically depicted a system in accordance with the present invention. The system utilizes chlorine gas and a 25% solution of sodium chlorite as the reactant compounds. All of the components required for the process can be mounted on a panel 1, which panel can be wall mounted if desired. In the system depicted, a supply means for water can be connected to inlet means 21. The amount of water provided to the reaction area can be controlled by valve 16. The normal supply pressure of the water is generally around 40 to 60 psig, but this is not critical. Lower pressures can be used as a booster pump 10 will compensate therefore. The flow of water cannot only be controlled by supply valve 16, but also by solenoid valve 8.

Gaseous chlorine is provided, preferably under vacuum, by feed line 22, with the supply rate being adjusted by chlorine meter 2. The sodium chlorite solution is supplied by feed line 23, with the supply rate being adjusted by meter 3. Both of the feed lines contain solenoid valves 9, which can control the flow of chemical through the feed line.

The sodium chlorite and chlorine gas are fed by their respective feed lines, preferably under vacuum, into eductor 5, through which the water stream flows. The chemical reactants and the water are then passed through a static mixer 25 to insure complete mixing of the compounds, and into reactor column 4, wherein the reaction of the chlorine gas and sodium chlorite to form chlorine dioxide takes place. The reactor column 4 preferably provides sufficient retention time to provide high yields of chlorine dioxide. The resultant product solution is then transferred via line 30 from the reactor column to exit 24, from which the product solution can be passed to a holding tank or to its ultimate end use, for example, the treatment of waste in a sewage plant. Before exiting, however, the product solution can be viewed through site glass 6. At this site, a colorimeter can be used, if desired. The product solution is also monitored by pH meter 7. The pH of the product solution should be between 2.7 and 3.5. A pH within this range indicates the generation process is proceeding at the optimum level. If a further analysis is to be performed, the product solution can be drawn from tap 15 provided at the base of the reactor column 4.

While the invention has been described with preferred embodiments, it is to be understood that variations and modifications may be resorted to as will be apparent to those skilled in the art. Such variations and modifications are to be considered within the purview and the scope of the claims appended hereto.

What is claimed is:

1. A system for the generation of chlorine dioxide which comprises
    (a) supply means for a water stream and means for delivering the water stream to a reaction zone;
    (b) supply means for reactant compounds, which when reacted together yield chlorine dioxide, and feed lines for separately feeding the reactant compounds to the water stream for reaction in the reaction zone;
    (c) mixing means for insuring complete mixing of the compounds after feeding the reacting compounds to the water stream;
    (d) means for transferring the reaction product from the reaction zone;
    (e) shutoff valves in the feed lines of the reactant compounds;
    (f) a monitoring system for monitoring the supply of water and reactant compounds through the feed lines, with the monitoring system being in cooperation with the shutoff valves such that the shutoff vales are closed to restrict any further flow through the feed lines of the reactant compounds when the monitoring system detects a loss in the supply of the reactant compounds or water, whereby the activation of the shutoff valves in the feed lines results in a continued flow of the water stream to purge the feed lines of any reactant compounds or chlorine dioxide; and
    (g) a pH meter downstream of the reaction zone, with the pH meter monitoring the pH of the chlorine dioxide reaction product solution being transferred from the reaction zone, and the pH meter being in cooperation with the shutoff valves in the feed lines such that the shutoff valves are closed to restrict any further flow through the feed lines when a pH outside the range of from about 2.7 to about 3.5 is detected.

2. The system of claim 1, wherein the mixing means (c) is a static mixer.

3. The system of claim 1, comprising an eductor through which the water passes, said eductor further comprising separate inlet means which are connected to the feed lines of the reactant compounds.

4. The system of claim 1, wherein the means for transferring the reaction product from the reaction zone is connected to a closed, hydropneumatic storage tank comprised of an eductor/booster pump withdrawal system for withdrawal of its contents under vacuum.

5. The system of claim 1, further comprising
    (h) a colorimeter downstream of the reaction zone, with the colorimeter being in cooperation with the shutoff valves in the feed lines such that when a color of the chlorine dioxide reaction solution is detected which indicates a concentration of chlorine dioxide above about 4,000 mg/l, the shutoff valves are actuated to restrict any further flow through the feed lines.

6. A process for the preparation of chlorine dioxide which comprises (a) separately feeding compounds, which when reacted together yield chlorine dioxide, via separate feed lines into a water stream, followed by mixing of the compounds;
(b) allowing said compounds to react in said water stream to yield chlorine dioxide and thereby form a chlorine dioxide solution;
(c) providing shutoff valves in the feed lines of the compounds and monitoring the feed lines of the compounds and the water stream with a monitoring system which is in cooperation with the shutoff valves such that when the monitoring system detects a loss in the supply of said compounds or water stream, the shutoff valves in the feed lines of the compounds are closed to restrict any further flow of the compounds through the feed lines;
(d) providing a pH meter downstream of the reaction between the compounds to yield chlorine dioxide and monitoring the pH of the formed chlorine dioxide solution by said pH meter, with the pH meter being in cooperation with the shutoff valves in the feed lines of said compounds such that when the pH meter detects a pH outside the range of from about 2.7 to about 3.5, the shutoff valves are closed to restrict any further flow of the compounds through the feed lines; and,
(e) providing a colorimeter downstream of the reaction between the compounds yielding chlorine dioxide, with the colorimeter being in cooperation with the shutoff valves in the feed lines of said compounds, such that when a color of the chlorine dioxide reaction solution is detected which indicates a concentration of chlorine dioxide above about 4,000 mg/l, the shutoff valves are actuated to restrict any further flow of the compounds through their feed lines.

7. The process of claim 6, wherein the compounds, which when reacted together yield chlorine dioxide, are an alkaline chlorite and gaseous chlorine.

8. The process of claim 7, wherein the alkaline chlorite is sodium chlorite.

9. The process of claim 6, wherein the compounds, which when reacted together yield chlorine dioxide, are separately fed into an eductor through which the water stream flows.

10. The process of claim 7, wherein the chlorine dioxide solution resulting from the reaction of the compounds is fed to a closed, hydropneumatic storage tank, which employs an eductor and booster pump to draw the chlorine dioxide solution from the storage tank under vacuum.

11. The process of claim 6, wherein the complete mixing of the compounds is accomplished by passage through a static mixer.

* * * * *